United States Patent [19]
Bush

[11] 3,732,986
[45] May 15, 1973

[54] WELDING ROD HOLDER
[76] Inventor: Charles E. Bush, 17 Baden Avenue, St. Louis County, Mo. 63147
[22] Filed: Apr. 9, 1971
[21] Appl. No.: 132,661

[52] U.S. Cl. ................................................211/60
[51] Int. Cl. ..............................................A47f 7/00
[58] Field of Search ........................211/60; 108/60

[56] References Cited
UNITED STATES PATENTS

| | | | |
|---|---|---|---|
| 2,734,790 | 2/1956 | Pospie | 211/60 R X |
| 3,385,451 | 5/1968 | Anderson | 211/60 R |
| 2,316,771 | 4/1943 | Davis | 211/60 R |
| 3,227,503 | 1/1966 | Fletcher | 211/60 R X |
| 2,758,723 | 8/1956 | Morris | 211/60 R X |

*Primary Examiner*—Nile C. Byers, Jr.
*Attorney*—Ralph W. Kalish

[57] ABSTRACT

A holder for diverse types of welding rods incorporating at least two rod-receiving compartments which are of different effective longitudinal extent so that rods of different lengths may be accommodated, as well as to permit of a projection of one series of rods beyond another to facilitate manual detection.

4 Claims, 9 Drawing Figures

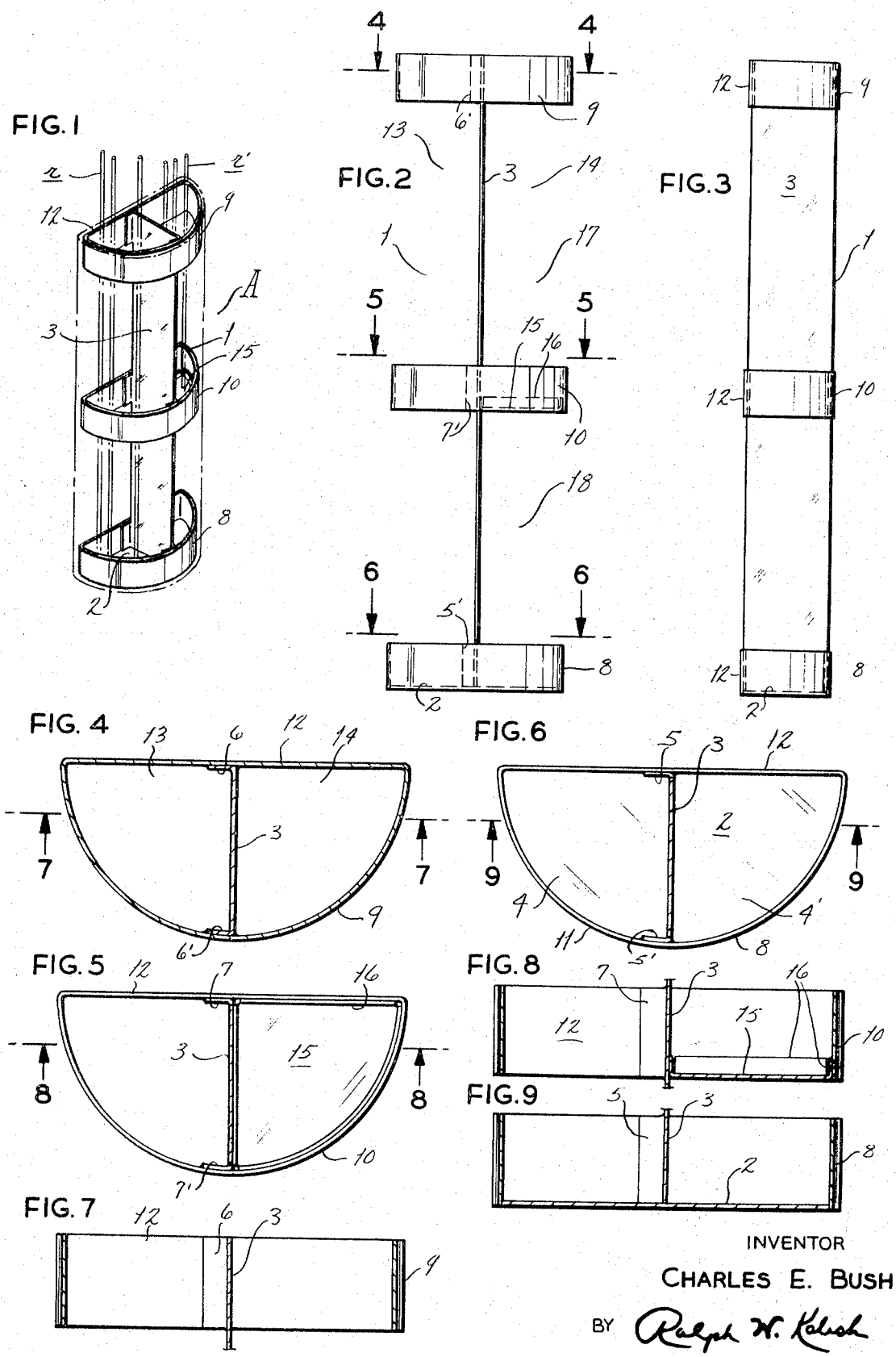

WELDING ROD HOLDER

BACKGROUND AND SUMMARY OF THE INVENTION

The present invention relates in general to receptacles and, more particularly, to a compartmented welding rod holder.

Heretofore, welders carried separate bundles of different type welding rods, such as the mild steel electrodes or the low hydrogen electrodes, which rods were necessary to accomplish the proper welding job at a construction site. Since often times the welders worked at relatively great heights and in cramped quarters, it was inconvenient, as well as dangerous, for the welder to carry separate bundles of rods. Also, loose rod bundles presented a hazard to personnel working below. In situations where the diverse welding rods were integrally bundled, it required a welder to search for the desired rod with attendant slow down in the welding procedure.

The present invention provides a welding rod holder which may be worn by a welder and which is compartmented for accommodating different types and lengths of welding rods, with the compartments being of different extent so that one group of rods may extend spacedly outwardly beyond another group for ready detection.

Therefore, it is an object of the present invention to provide a welding rod holder which assures facile determination of, and, ease of access to, the desired welding rod.

Another object of the present invention is to provide a welding rod holder of the type described which may be worn by a welder, as by attaching same to his belt, or to a strap swung around his shoulder.

A further object of the present invention is to provide a welding rod holder of the type described which is safe in usage, leaving the welder's hands free for permitting safe travel up and down ladders and the like; and also enabling him to carry sufficient welding rod types to insure against unnecessary loss of time to replenish his rod supply.

It is another object of the present invention to provide a welding rod holder of the type stated which may be most economically manufactured; which is durable and reliable in usage, being formed of rigid material; and the use of which conduces to economies in a welder's time, as well as eliminating hazards heretofore accepted by the handling of rods and loose bundles.

BRIEF DESCRIPTION OF THE DRAWINGS

FIG. 1 is a perspective view of a welding rod holder constructed in accordance with and embodying the present invention illustrating an outer cover in phantom lines.

FIG. 2 is a front elevational view of the welding rod holder shown in FIG. 1.

FIG. 3 is a side elevational view.

FIG. 4 is a horizontal section taken on the line 4—4 of FIG. 2.

FIG. 5 is a horizontal section taken on the line 5—5 of FIG. 2.

FIG. 6 is a horizontal section taken on the line 6—6 of FIG. 2.

FIG. 7 is a vertical section taken on the line 7—7 of FIG. 4.

FIG. 8 is a vertical section taken on the line 8—8 of FIG. 5.

FIG. 9 is a vertical section taken on the line 9—9 of FIG. 6.

DESCRIPTION OF THE PREFERRED EMBODIMENT

Referring now by reference characters to the drawing which illustrates the preferred embodiment of the present invention, A generally designates a welding rod holder comprising a body 1 which is preferably of open framework and although the same may be annular in cross section, is illustrated herein as being semi-circular in cross section for exemplary purposes. Body 1 incorporates a base wall 2 upon which centrally is mounted a vertical support member 3; said latter may be suitably affixed, as by welding, to base plate 2. The transverse extent of support member 3 is substantially the same as the radius of base wall 2 and being located on the transverse axis of the latter to divide same into sections, of equal area, 4, 4'. Said support member 3 is provided on its side margins, at its upper and lower ends and at substantially its midpoint, with transversely aligned pairs of mounting flanges 5, 5'; 6, 6'; and 7, 7', respectively, which latter are in normal planar relationship to the main plane of support member 3. Each of said pairs of mounting flanges 5, 5', 6, 6' and 7, 7' are fixed on their outer surfaces to the confronting inner portions of rod-retention bands 8, 9, 10, respectively. Each band is of like size and contour; being semi-circular in cross section for registration with botton wall 2. Thus, mounting flanges 5', 6', and 7' are secured to the arcuated portion, as indicated at 11, of the related band, while the companion mounting flanges 5, 6, and 7 are secured to the rectilinear portion 12 of the associated band. As may best be seen in FIG. 9, the inner lower end portions of band 8 are secured, as by welding, to the edge of base wall 2 for further rigidification of body 1. It will be observed that the upper edge of top band 9 constitutes the upper margin of body 1. Accordingly, it will be seen that support member 3, together with bands 8, 9 and 10, cooperate to define a pair of vertical compartments 13, 14, the bases of which are constituted of bottom wall sections 4, 4', respectively. Each of said compartments are of general quadrant shape in cross section.

Provided within compartment 14 for securement to band 10 and support member 3 is a plate 15 presented in planar parallel relationship to bottom wall 2 and having a continuous marginal, upstanding short flange 16, for fixing, as by welding, to the adjacent confronting portions of band 10 and support member 3 (see FIGS. 2 and 8). Said plate 15 effectively divides compartment 14 into an upper and lower portion 17, 18, respectively.

By provision of plate 15, rod holder A effectively constitutes an elongated compartment 13 and a relatively shorter compartment, as formed by upper portion 17 of compartment 14.

In actual usage, body 1 may be disposed within a suitable covering, as indicated in phantom lines in FIG. 1, which may be constructed of suitable fireproof, flexible material, such as, asbestos, or may be enclosed by more rigid materials if desired. Rod holder A with or without an outer covering may be readily adapted for suspension as by suitable means from the user's belt or shoulder; or, if desired, may be adapted for disposition upon a support surface immediately adjacent the working area.

Rod holder A in usage is extremely versatile in that by virtue of the differential in extents of compartment 13 and 17, welding rods or so-called electrodes of different length may be accommodated therein. It is most customary for welders to require different types of electrodes, such as, for instance, mild steel electrodes and low hydrogen electrodes, as the nature of such electrodes depends upon the particular type of welding to be undertaken. Many times the welding is to be effected on a scaffold or at an elevated point in a building under construction and the like, so that it is extremely inconvenient and costly for a welder to be insufficiently equipped with the necessary types of electrodes when the work is to be effected at a point remote from normal supply. Furthermore, during welding operations, it is time consuming and difficult for welders to discontinue work and remove their mask for the purpose of selecting the requisite electrode.

Also when electrodes of varying length are required, a welder must also stop work to attempt to locate the shorter rod.

By the present invention a relatively longer rod, indicated r, is accommodated in compartment 13, while shorter rods, as indicated r', may be retained within section 17 of compartment 14. Thus, the same are presented readily for sensitive detection by the welder so that he need not discontinue his work to make the appropriate choice. Additionally, if manual detection could not be easily effected by reason of similarity of diameter and the like of the two types of rods, the location of plate 15 would allow of rods disposed thereon to extend beyond the upper end of body A to a point above the rods r in chamber 13. Such differential in extent could be readily determined by a welder without having to cease operations.

Accordingly, in view of the foregoing, it will be seen that rod holder A is extremely useful in operation, permitting a welder to retain an appropriate supply of the different types of rods that might be required at a point distant from the supply, and which rod holder will conduce to substantially immediate detection by the welder of the desired rod so that discontinuance in welding procedures will be of minimum duration.

Although rod holder A is shown as being of semi-circular cross section, it is obvious that the same could as easily be of circular configuration without departing from the spirit of the present invention. By such circular contour, four vertical compartments could be provided as opposed to the two shown in the drawing. Manifestly, with more than two compartments, the same could be easily arranged to present different, effective lengths so that a multiplicity of rod lengths could be accommodated. Commensurate adjustment of the bands and plates could be quite simply achieved.

Thus, it is clear that with an annular base the vertical upright will have a transverse extent coincident with the diameter of such base and with there being lateral uprights which are in alignment but planarwise normal to the plane of the main upright. Each of said lateral uprights will have a transverse extent coincident with the radius of such base member; each being secured as by welding to the main support member. For this type of design the bands are preferably annular and located vertically with respect to the support members so as to present plates corresponding to plate 15 at selected vertical dispositions on the holder, thereby accommodating rods of a multiplicity of lengths.

Having thus described my invention, what I claim and desire to obtain letters patent for is:

1. A welding rod holder comprising a flat base, a vertical support fixed in its lower portion to said base and extending upwardly therefrom, said vertical support having a transverse extent substantially coincident with the cross sectional extent of said base, a plurality of frame-forming band-like members secured on said vertical support in mutually vertically spaced relationship, the lowermost band-like member being adjacent said base and the uppermost band-like member being adjacent the upper or base-remote end of said vertical support, said band-like members being presented surroundingly of said vertical support and defining areas substantially coincident with the area of said base, said band-like members being in registration with the marginal portions of said base whereby said band-like members together with the base and said vertical support define a pair of compartments, one each on opposite sides of said vertical support, and a rod support plate engaged to one side of said vertical support and to one of said band-like members located upwardly of said base, in parallel disposition to said base whereby the same effectively divides the related compartment into an upper and lower portion.

2. A welding rod holder as defined in claim 8 and further characterized by there being three band-like members mounted on said vertical support, said rod support plate being engaged to the intermediate band-like member.

3. A welding rod holder as defined in claim 1 and further characterized by said band-like members being of semi-circular configuration and said base being of semi-circular configuration.

4. A welding rod holder as defined in claim 1 and further characterized by said band-like members and said base being of annular configuration.

* * * * *